June 11, 1957 F. G. CORNELL, JR 2,795,404
MIXER
Filed March 23, 1954 3 Sheets-Sheet 2
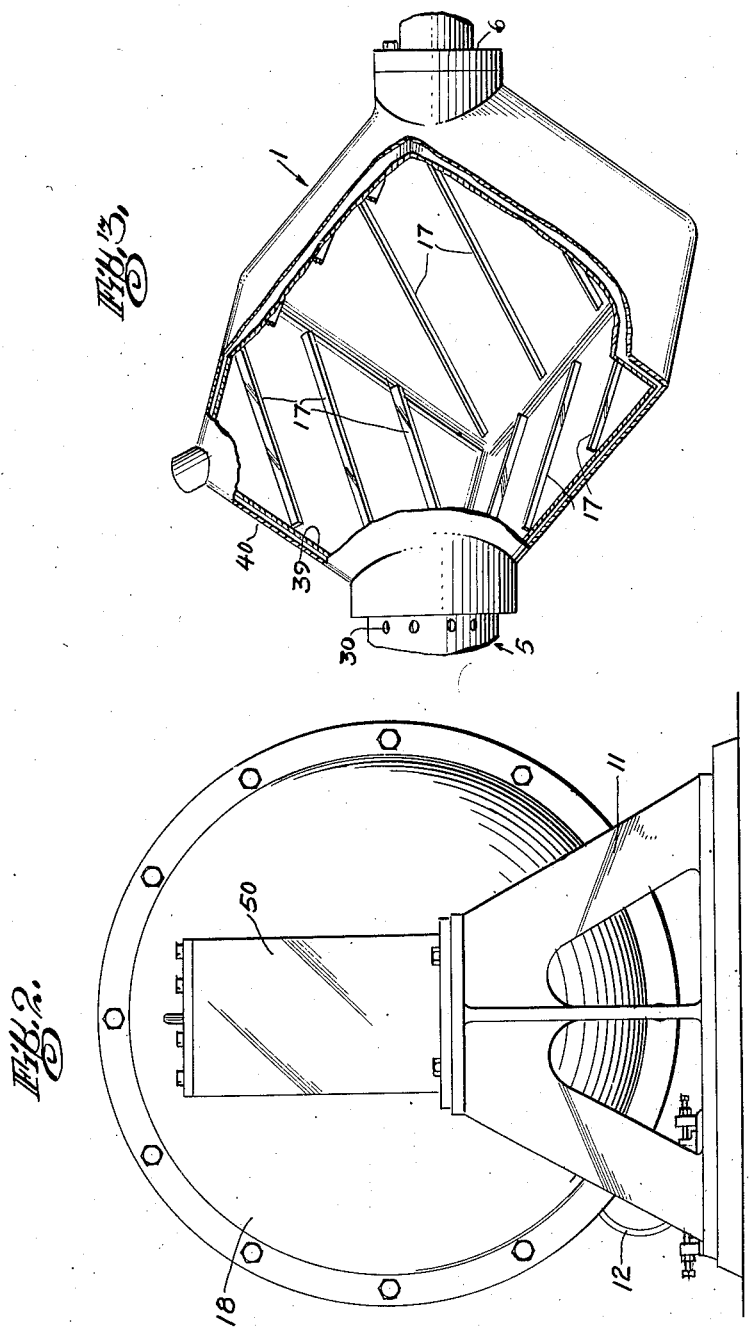
INVENTOR
*Fritz G. Cornell, Jr.*
BY
*Kenyon & Kenyon*
ATTORNEYS

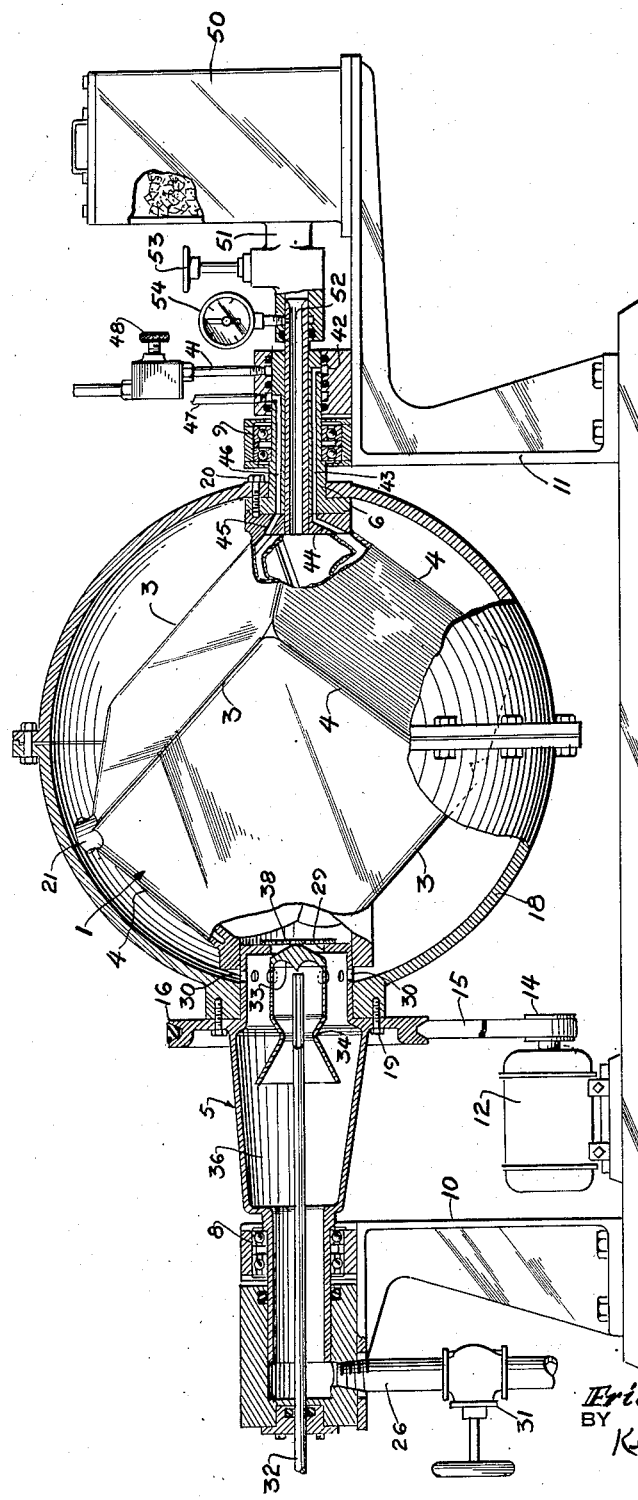

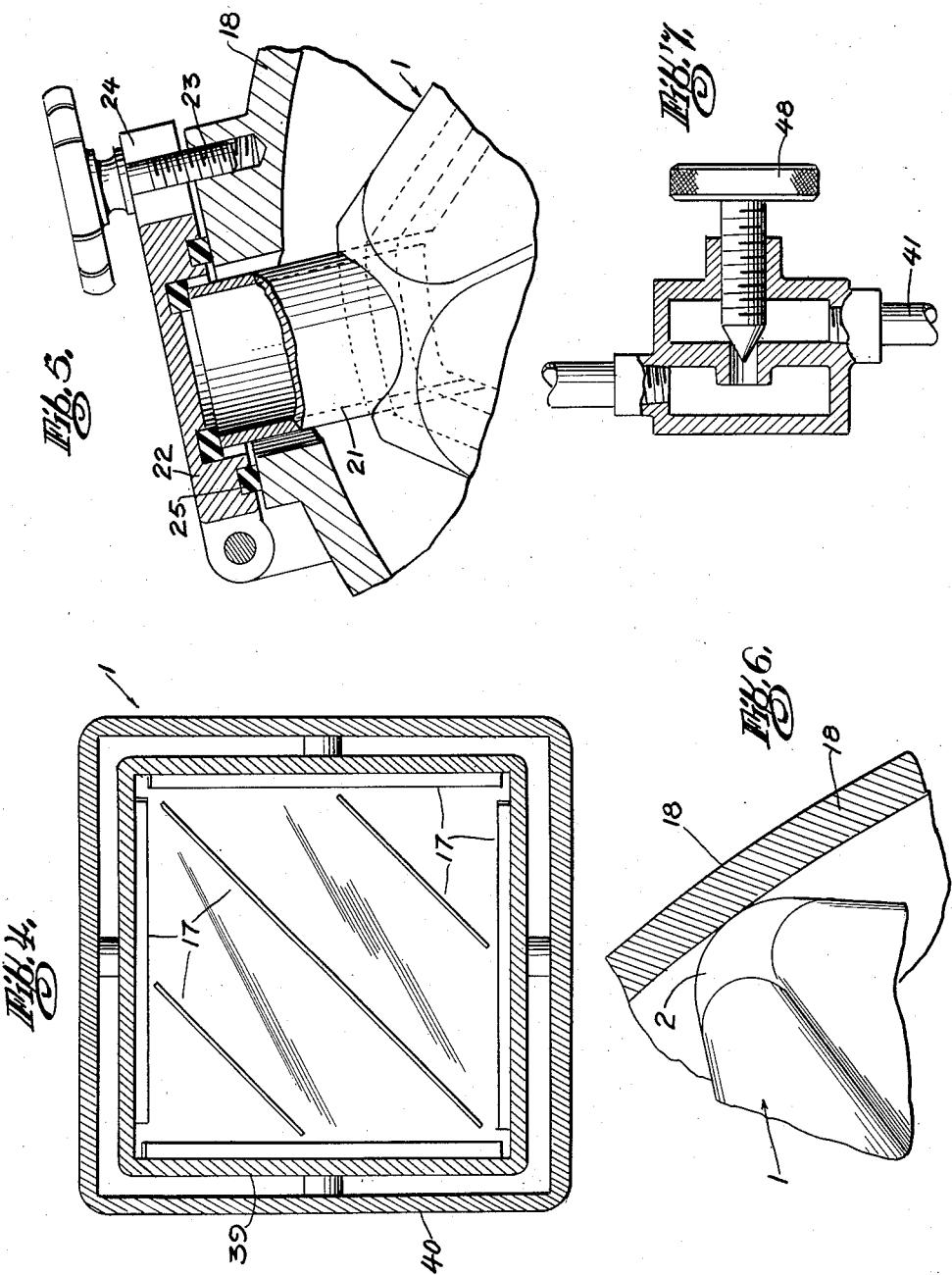

United States Patent Office 2,795,404
Patented June 11, 1957

2,795,404
MIXER

Fritz G. Cornell, Jr., Mountain Lakes, N. J.

Application March 23, 1954, Serial No. 418,063

4 Claims. (Cl. 259—14)

This invention relates to an improved mixer adapted to impart to its contents both rotary and lateral motion and provided with means for controlling the condition of contents during mixing; for example, heat or cold may be applied to material in the mixer while it is processed, and at the same time the material may be subjected to pressures varying from subatmospheric to abnormally high, as and when desired.

It has been found necessary at times to subject a product while being processed, to differing stages of treatment. It has been a common practice to treat the product in a machine where only one step of the desired process can be applied; after which the product must then be transferred to another machine, where the next step in the processing is carried out. This may have to be repeated many times, and it is only after numerous such separate steps have been taken and much transporting of the product done that the desired results are obtained.

A principal object of the invention is to provide a machine in which agitating, mixing, kneading, heating, or cooling and other operations may be simultaneously performed at a desired pressure.

In accordance with this invention, I provide a mixer for either solids, liquids, semi-liquids (that is, mixtures of liquids and solids), powders and other flowable materials, the said mixer comprising an inside mix-holding container of generally parallelepipedonal (or other flat-sided) shape and an enclosing generally spherical or globular outside shell, both being so fastened together so as to revolve as one, thereby permitting the construction of a light-weight mixer capable of withstanding pressures above and below atmospheric.

One of the purposes of the spherical globular outside enclosure is to provide a simple strong light-weight mechanical means for confining a subatmospheric pressure that may be used, or to withstand the high pressures it may be found advisable to use, while agitating, mixing, blending, heating, or cooling and processing various ingredients that may be used within the container at different stages of treatment.

By employing the parallelepipedonal or flat-sided container, the product is subjected to a most thorough and complete mixing. There is not only the usual rotary action furnished by the revolving mixing container, but in addition a kneading action, due to the flat sides of the container. As the container is mounted on bearings at near diagonally opposite corners, there is a lateral back and forth movement of the bulk mass to be mixed, a number of times during each revolution. This, in combination with the normal revolving action, furnishes a most complete and thorough agitation and mixing, the degree of thoroughness of which is controlled by adjusting the speed of rotation of the container. A number of fin-like baffles may be provided for retarding slippage of the material treated, the steepness of the fin pitch adding to the lateral movement of the product to be mixed.

In addition, simple means are provided for the application of heat and cold to the heat exchange surfaces of the flat-sided container. The space between the container and the outer enclosing spherical-like enclosure may be subjected, because of its curved construction, to unusually wide variations of pressure, which in turn can be transmitted to the product being agitated, mixed, or otherwise treated and processed.

In order that the invention may be better understood, attention is directed to the accompanying drawings, forming a part of this specification and in which:

Fig. 1 is a central longitudinal sectional view of one embodiment of my invention, the container being shown partly in elevation and partly broken away;

Fig. 2 is an end view of the same;

Fig. 3 is a detail view of the container partly in elevation and partly broken away so as to show the interior of the container.

Fig. 4 is a cross section of the container;

Fig. 5 is a detail sectional view showing the door by which material to be treated may be introduced into and removed from the container;

Fig. 6 is a detail view showing the contact between the container and the enclosure therefor;

Fig. 7 is a sectional view of the valve for controlling the admission of a heat exchange medium.

Referring to the drawings, the container 1 is of parallelepipedonal shape with its corners rounded as shown at 2 in Fig. 6. It may be made cube-shape; but, in order to increase the lateral movement of the contents of the container, the four parallel side edges 3 thereof may be made of greater length than the end edges 4, so that the side walls of the container are of greater length than the end walls thereof. The latter arrangement gives to the contents of the container a larger lateral motion than where a cubular container is used, thus resulting in a more highly efficient mixing action. The container 1 may be made of metal or other suitable material. It is supported for rotation at two diagonally opposite corners, as by hollow journals or trunnions 5 and 6 supported, as by ball bearings 8 and 9, respectively, from fixed pedestals 10 and 11.

The container may be rotated continuously to any desired extent by any suitable means, for example, by a variable speed electric motor 12 whose shaft is provided with a pulley 14 connected by a belt 15 with pulley 16 in driving relation to the journal or trunnion 5. As the container 1 is rotated, successive corners assume their lowermost positions, first a corner on one side of the vertical plant 1—1 (Fig. 1) passing through the center of the container and then a corner on the opposite side of the said plane, with the result that the contents of the container are caused to move laterally from one side of the container to the other. Accordingly, the contents of the container are subjected to agitation resulting not only from the up and down movement of the contents, but also the lateral back and forth movement thereof.

In order to increase the agitation of the material treated, each inner face of the container 1 is provided with a plurality of baffles or ribs 17, as shown in Fig. 3. During the rotation of the container these baffles or ribs act to lift the material within the container and then to allow the same to fall, thereby increasing the concussion to which the contents of the container are subjected upon falling. To secure the most efficient action, I preferably arrange the baffles 17 with a steep pitch so that they extend at an angle to a plane passing through the axis of rotation of the container.

The enclosing shell 18, which is preferably made of substantially spherical shape is secured at one side, as by screws 19, to the pulley 16 so as to rotate with the container 1. The other side of the enclosure may be secured, as by screws 20, directly to the container. At one of the corners of the container 1, there is provided an opening 21 for admitting or removing the material treated. As more clearly shown in Fig. 5, this opening is closed by a circular door 22. This door or closure may be secured in closed position by a manually operable screw 23, the stem of which passes through a slot 24 in the door into a threaded opening in the shell 18, the head of the screw bearing against the outer surface of the door. To produce a fluid type connection between the door 22 and the shell 18, the lower face of the door may be provided with a yielding gasket 25 which bears upon the outer surface of the shell 18. To avoid vibration between the enclosure 18 and the container 1, the corners of the container not secured to the enclosure or to the rotating trunnions are arranged to bear firmly against the enclosure as shown in Fig. 6.

To effect a pressure differential between the atmosphere and the space within the container 1, as well as the space between the said container and the enclosing shell 18, the interior of the hollow journal or trunnion 5 is arranged to communicate with a pipe connection 26. The trunnion or journal 5 is formed at its inner end with an opening 29, which establishes communication between the inside of the trunnion or journal 5 and the container 1. Communication between the inside of the journal or trunnion 5 and the space between the container 1 and enclosing shell 18 is established by lateral openings 30 in the journal or trunnion. By reason of the openings 29 and 30, the pressure within the container 1 is automatically equalized with the pressure in the space between the said container and the shell 18. The pipe connection 26 is preferably provided with a suitable valve 31 to control the admission or exhaust of air relatively to the container 1 and shell 18.

The vacuum may also be produced by apparatus forming a part of the mixer. To this end, there is provided a fluid inlet tube 32 extending axially through the hollow journal 5, but spaced from the inner surface thereof. The inner end of the tube 32 is arranged to project a stream of fluid, such as water or steam, against a deflecting member having a surface 33 which is reversely curved from a central apex to disperse the fluid into a spray and deflect it backwardly through the Venturi 34 from which it passes into the enlarged space or chamber 36 within the trunnion 5. In this space it is caused to entrain or carry with it the adjacent air which is exhausted with it through a suitable outlet, such as the connection 26. The entrainment of the air in the space 36 causes the withdrawal of air by suction, through openings 29 and 30 from the container 1 and the space between the container and its enclosing shell, thereby creating a vacuum within the container and the said space. The deflecting member 33 and the Venturi 34 may be secured to the hollow trunnion (as by spacing members, not shown) so as to rotate therewith. To prevent the passage of the material treated from the inside of the container 1 into the vacuum chamber 36, the trunnion 5 may be provided with a suitable means, such as screen 38 covering the exhaust opening 29.

For the heating or cooling of the contents of the container, the container walls are preferably constructed to permit the passage of a heat exchange medium therethrough. To this end the container is provided with spaced inner and outer walls 39, 40 (Figs. 3 and 4) between which the heat exchange medium, such as hot or cold water or steam, may be circulated. The heat exchange medium may be admitted to this space through an inlet 41 from which it passes through the annular opening 42, the passage 43 in the journal or trunnion, and the passage 44 into the space between the walls 39 and 40. After circulating through this space, the heat exchange medium is withdrawn through passages 45, 46 in the journal or trunnion, and outlet connection 47. To control the admission of the heat exchange medium, a suitable valve 48 may be connected to the inlet 41, as more clearly shown in Fig. 7.

To permit the supply of material to the container 1 during the rotation thereof, a stationary storage bin 50 communicates through outlet 51 and conduit 52 with the interior of the container 1, the conduit 52 passing through the hollow trunnion 6. The flow of the material from the outlet 51 may be controlled by a suitable valve 53. If desired, a pressure gauge 54 may be arranged to communicate with the interior of the conduit 52 to indicate the pressure within the container 1.

In use, the material to be treated is introduced into the container 1, either through the door 22 or from the storage vessel 50 or both. The container 1 and its enclosing shell 18 are then rotated so that the material within the container is agitated and subjected to the shocks incident to its movement both up and down and from one side to the other of the container. By reason of this action upon the contents, a slab of highly compressed fibrous material may be separated or broken into smaller parts. Furthermore, products of a fatty or oily nature may be quickly and thoroughly mixed with the finely divided solid material. During this mixing operation, the product may be subjected to a vacuum or to a pressure above atmosphere. For example, where it is desired to remove moisture from the material treated, the application of a vacuum to the interior of the container serves to facilitate the removal of the moisture from the material, after which other fluid material is readily absorbed into the fibrous or porous material. During these operations, it may also be desirable to apply heat to or withdraw it from the product. This may be achieved as heretofore described.

By reason of its substantially spherical shape, the enclosing shell, although made of light weight, is capable of withstanding a very large pressure difference between its inner and outer surfaces. As the pressure within the container and in the space between the container and enclosing shell is maintained in balanced or equalized condition, the container may be made of relatively thin flat walls. Accordingly, both the container and the enclosing shell may be made relatively light and yet will be capable of withstanding a high degree of vacuum or pressure, thus enabling the contents of the container to be subjected to a like vacuum or pressure.

It is understood that various modifications may be made in the apparatus described above without departing from the spirit of the invention as defined in the appended claims.

I claim:

1. The combination of a parallelepipedonal container mounted for rotation about a horizontal axis passing diagonally through opposite corners thereof to mix the contents thereof, said container being provided with baffles arranged at an angle to a plane passing through the axis of rotation of the container and with walls formed to permit the circulation of a heat exchange medium therethrough, a spherical enclosure for the container fixedly secured thereto to move as a unit therewith about said axis, means whereby a pressure differential may be maintained between the atmosphere and the spaces in said container and the said enclosure, said last-named means including means for automatically equalizing the pressure in the container and in the space between the container and in the enclosure, and means for feeding material to be treated to the interior of said container during the rotation thereof.

2. The combination of a mixing container mounted for continuous rotation about a horizontal axis, an airtight enclosure for the container fixedly connected thereto for rotation therewith, means for maintaining a pressure differential between the atmosphere and the space in said container and for automatically equalizing the pressure in the container and in the space between the container and enclosure, and means for feeding material to be treated to the interior of said container during the rotation thereof.

3. The combination of a parallelepipedonal container mounted for continuous rotation about a horizontal axis passing diagonally through opposite corners thereof, said container being provided with walls formed to permit the circulation of a heat exchange medium therethrough, a spherical enclosure for the container fixedly secured thereto to move as a unit therewith about said axis, and means whereby a pressure differential may be maintained between the atmosphere and the space within said container and the space betwen said container and said enclosure, said last named means including means for automatically equalizing the pressure within the container and in the space between the container and the enclosure, and comprising a hollow member rotatable with the container and communicating with the interior thereof and vacuum producing means in said hollow member including a supply member for passing fluid into said hollow member, means for deflecting fluid discharged by said fluid supply member to entrain air therewith, and means for thereafter affecting discharge of said fluid and air.

4. The combination of a container movable to produce up and down as well as lateral movement of its contents, a convexly curved enclosure surrounding the said container and fixedly connected thereto to move as a unit therewith, means whereby a pressure differential may be maintained between the atmosphere and the spaces in said container and enclosure, said means including means for automatically balancing the pressures in the container and in the space between the container and the enclosure, and means for feeding material to be treated to the interior of said container during the rotation thereof.

References Cited in the file of this patent
UNITED STATES PATENTS

| | | |
|---|---|---|
| 263,349 | Opper et al. | Aug. 29, 1882 |
| 447,673 | Flottmann | Mar. 3, 1891 |
| 664,130 | Culmann et al. | Dec. 18, 1900 |
| 1,733,724 | Downs | Oct. 29, 1929 |
| 1,787,101 | Bramwell | Dec. 30, 1930 |
| 2,267,898 | Cornell | Dec. 30, 1941 |
| 2,643,463 | Grantham | June 30, 1953 |